United States Patent
Steckling et al.

(10) Patent No.: US 9,909,711 B2
(45) Date of Patent: Mar. 6, 2018

(54) HOLDING APPARATUS FOR A HOUSING, AND METHOD FOR INSTALLATION OF THE HOUSING, USING THE HOLDING APPARATUS

(71) Applicant: R. STAHL Schaltgeräte GmbH, Waldenburg (DE)

(72) Inventors: Tim Steckling, Pfedelbach (DE); Christoph Gajditsch, Forchtenberg (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 0 days.

(21) Appl. No.: 15/037,550

(22) PCT Filed: Nov. 12, 2014

(86) PCT No.: PCT/EP2014/074406
§ 371 (c)(1),
(2) Date: May 18, 2016

(87) PCT Pub. No.: WO2015/074933
PCT Pub. Date: May 28, 2015

(65) Prior Publication Data
US 2016/0281916 A1    Sep. 29, 2016

(30) Foreign Application Priority Data
Nov. 19, 2013   (DE) .................. 10 2013 112 761

(51) Int. Cl.
*A47F 1/10*    (2006.01)
*F16M 13/02*    (2006.01)
(Continued)

(52) U.S. Cl.
CPC ............ *F16M 13/02* (2013.01); *F24F 13/20* (2013.01); *F24F 13/32* (2013.01); *H02B 1/40* (2013.01); *F24F 2221/17* (2013.01)

(58) Field of Classification Search
USPC .................................................... 248/297.21
See application file for complete search history.

(56) References Cited

U.S. PATENT DOCUMENTS

4,056,250 A * 11/1977 Uchiyama ............... E02F 3/382
                                                             172/272
4,097,012 A *  6/1978 McIntyre ............ B60R 11/0205
                                                             224/540
(Continued)

*Primary Examiner* — Monica Millner
(74) *Attorney, Agent, or Firm* — Leydig, Voit & Mayer, Ltd.

(57) ABSTRACT

The invention relates to a holding apparatus (10) for a housing (11) and method for affixing the holding apparatus (10) and the housing (11) to an affixation surface, in particular an external building surface. The holding apparatus (10) has two holding parts (12) that each have a holding segment (25) that extends in a longitudinal direction (L). At least one of the two holding parts (12) additionally has a locking segment (43). Two attachment parts (46) and, for each locking segment (43), one locking part (47) are affixed to a rear wall (11b) of the housing (11). To mount the housing (11) on the holding apparatus (10), the two attachment parts (46) are firstly each brought into engagement with their respective holding segment (25). By displacing the housing (11) in the longitudinal direction (L), the locking part (47) enters into engagement with the locking segment (43). A continued movement of the housing (11) in the longitudinal direction (L) is at least delimited.

17 Claims, 5 Drawing Sheets

(51) Int. Cl.
  *F24F 13/32*     (2006.01)
  *H02B 1/40*      (2006.01)
  *F24F 13/20*     (2006.01)

(56) References Cited

U.S. PATENT DOCUMENTS

| | | | | |
|---|---|---|---|---|
| 5,582,025 A | * | 12/1996 | Dubin | F24F 1/0003 248/544 |
| 5,796,585 A | * | 8/1998 | Sugiyama | H05K 7/1435 108/108 |
| 6,145,334 A | * | 11/2000 | Mochizuki | F24F 1/0003 248/200 |
| 6,191,357 B1 | * | 2/2001 | Daoud | H02G 3/088 174/50 |
| 6,354,555 B1 | * | 3/2002 | Nishizuka | F24F 13/32 248/544 |
| 6,520,605 B2 | * | 2/2003 | Nunokawa | H05K 5/0204 312/111 |
| 7,042,710 B1 | * | 5/2006 | Beseth | H05K 7/1412 312/223.2 |
| 7,121,105 B1 | * | 10/2006 | Rais | F24F 1/0003 62/262 |
| 8,605,434 B2 | * | 12/2013 | Chao | H05K 5/0204 361/690 |
| 9,217,449 B2 | * | 12/2015 | Lee | F16B 1/00 |
| 9,638,456 B2 | * | 5/2017 | Renken | F25D 23/006 |
| 2006/0059932 A1 | * | 3/2006 | Czechowicz | B60H 1/00535 62/239 |
| 2009/0251033 A1 | * | 10/2009 | Helms | H02B 1/40 312/246 |
| 2011/0110026 A1 | * | 5/2011 | Goza | H05K 5/0021 361/679.6 |
| 2012/0218725 A1 | * | 8/2012 | Snider | H04B 1/082 361/753 |

\* cited by examiner

HOLDING APPARATUS FOR A HOUSING, AND METHOD FOR INSTALLATION OF THE HOUSING, USING THE HOLDING APPARATUS

FIELD OF THE INVENTION

The invention relates to a holding apparatus for a housing and to a method for affixing the housing to an affixation surface such a wall surface, particularly an outdoor wall surface by way of example, utilizing the holding apparatus.

BACKGROUND OF THE INVENTION

A housing having a holding apparatus for affixing the housing to an affixation surface is known, for example, from DE 20 2005 007 318 U1. There, the housing consists of three side surfaces as well as a roof inclined at a slant. The housing is open toward the affixation surface. The housing can be affixed to the affixation surface using hooks or screws. The known housing, for example, serves to cover a ventilation unit.

OBJECTS AND SUMMARY OF THE INVENTION

It is the object of the present invention to provide an improved holding that apparatus enables simple and flexible installation of a housing.

The holding apparatus has two holding parts. Each holding part has an affixation segment, which is set up for being affixed to an affixation surface, using an affixation means, for example a dowel connection and/or a screw connection. For example, the affixation segment can have corresponding holes for accommodating screws. The two holding parts are preferably structured as separate holding parts or can be displaced relative to one another so that they can be affixed to the affixation surface at a variable distance in a transverse direction.

Each holding part has a holding segment that extends in the longitudinal direction. Each holding segment has an attachment part assigned to it. The attachment part can be brought into engagement with the holding segment in such a manner that it can be displaced in the longitudinal direction relative to the holding segment. The attachment parts are attached to the housing and produce the connection between the housing and the holding parts. The relative displacement between the attachment parts and the holding segments is preferably achieved by means of an interlocking connection that has play, with a degree of freedom of movement in the longitudinal direction. In an exemplary embodiment, the holding segments each form a rail, on or in which the assigned attachment part is disposed so as to be displaceable in the longitudinal direction. In particular, an attachment part that is engaged with the assigned holding segment can be moved along the holding segment exclusively in the longitudinal direction, aside from movement play, so that only one degree of freedom remains for a relative movement between the attachment part and the holding part.

The holding apparatus furthermore has at least one locking part. The locking part is also attached to the housing, preferably on the same housing side as the attachment parts. A plurality of locking parts can also be provided. In a preferred exemplary embodiment, the attachment parts and the at least one locking part are identical in construction, so that only the affixation location on the housing or the orientation relative to the housing determines the function of this component as a locking part or as an attachment part.

The locking part works together with a locking segment. At least one of the two holding parts has a locking segment. Preferably, each of the holding parts has a locking segment so that, accordingly, two locking parts belong to the holding apparatus. The locking part can be brought into engagement with the assigned locking segments. The relative movement between the attachment part and the holding part, in the longitudinal direction, is delimited or prevented at least in one direction or toward one side, if the locking part and the assigned locking segment are in engagement. If the longitudinal direction of the holding part is oriented in the vertical direction, the locking part can delimit or prevent the relative movement of the attachment part at least vertically downward on one side.

Housings of different sizes can be easily and flexibly attached to an affixation surface, in a releasable manner, by means of the holding apparatus. The distance between the two holding parts is adapted to the size of the housing. A further adaptation possibility can also result from affixation of the attachment parts and of the locking part on the housing. Housings having different dimensions in the longitudinal direction can be installed on the affixation surface easily and quickly by means of the holding apparatus. The length of the holding segments in the longitudinal direction can correspond, for example, to the size difference, in the longitudinal direction, of the housings to be affixed. Preferably, the length of the holding segments is selected in such a manner that the holding parts can be used for housings of different sizes. The length of the holding segments, in the longitudinal direction, can lie in the range from 20 cm to 70 cm in an exemplary embodiment for affixing housings in available standard sizes, and can particularly amount to 40 cm to 62 cm. When the locking part is in engagement, the position of the attachment parts relative to the assigned holding segment changes as a function of the dimension of the housing in the longitudinal direction. In an exemplary embodiment, the housing is connected to the two holding parts (12) only by way of the attachment parts and the locking part. A screw connection or another additional interlocking connection is eliminated. In an embodiment, screws can be used as clamping means for reducing or eliminating play, without taking on a significant holding function while doing so, to support the load of the housing on the housing parts.

In a preferred exemplary embodiment, the at least one locking part and/or each attachment part has two limb parts disposed at a distance from one another, which delimit a gap disposed between the limb parts. This gap is in particular continuous and open on three sides. On each of two sides, the gap is delimited by a limb part. On a further side, the gap can be closed, at least in part, by means of a transverse part that connects the two limb parts to one another.

Preferably, the transverse part of the locking part closes the gap on one side, in the longitudinal direction, at least in part. Furthermore, it is preferred if the transverse part closes the gap in a transverse direction, at least in part.

The transverse direction is oriented at a right angle to the longitudinal direction. The transverse direction and the longitudinal direction span a plane that is oriented parallel to the affixation surface. When installation is complete, the longitudinal direction can correspond to the vertical direction, for example, while the transverse direction corresponds to the horizontal direction.

When the locking part is in engagement with the assigned locking segment, the two limb parts and the transverse part can enclose the locking segment on the assigned holding part. Correspondingly, the two limb parts and the transverse part of an attachment part can enclose the assigned holding segment of the holding part. The locking segment and the holding segment then pass through the gap delimited by the limb parts and the transverse part, in each instance.

Preferably, the holding segment of each holding part borders on a longitudinal slot that extends in a longitudinal direction. The attachment part can be brought into engagement with the holding segment through this longitudinal slot, and can be disposed so as to be displaceable in the longitudinal direction. In this regard, an insertion recess can follow on from the holding segment of each holding part, in the longitudinal direction, in which recess the longitudinal slot ends. The attachment part can be brought into engagement with the holding segment by way of the insertion recess. The insertion recess is a widened region of the longitudinal slot in the transverse direction, so to speak.

In a preferred exemplary embodiment, at least one of the two holding parts has a locking recess on which the locking segment borders. The locking recess can be open, for example in the longitudinal direction, on the side averted from the holding segment, for example vertically upward. In an embodiment, the locking part can be hooked into the locking segment, so to speak.

It is furthermore advantageous if at least one of the two holding parts has a side wall segment that is oriented at a slant or at a right angle to a plane spanned by the longitudinal direction and the transverse direction. In particular, the side wall segment projects away from the affixation segment at a slant or at a right angle. The side wall segment delimits an accommodation region for the housing. Thus, the accommodation region can also be situated between two side wall segments, for example, if both holding parts have a side wall segment of this type.

Consequently, the holding apparatus can serve both to carry the housing and to protect the housing against environmental influences, such as precipitation or solar radiation.

Preferably, the holding apparatus has a connection part. The connection part can be connected, by way of a first end, to one holding part, and, by way of a second end, to the other holding part, so that said connection part extends in the transverse direction between the two holding parts. When the connection is produced, it is preferably disposed at a distance from the holding segments in the longitudinal direction. The connection part can have a wall segment that serves as a roof when the longitudinal direction is oriented in the vertical direction. The wall segment of the connection part, together with the at least one side wall segment of a holding part, can delimit the accommodation region and bring about corresponding protection against environmental influences. Preferably, the wall segment is oriented at a slant or at a right angle to a plane that is spanned by the longitudinal direction and the transverse direction.

The holding apparatus can have at least one securing part having a securing segment. Preferably, the connection part can have the at least one securing segment. When the connection of the securing part or of the connection part to the two holding parts has been produced, the securing segment can delimit or prevent a movement of the at least one locking part in the longitudinal direction. For example, it is possible that the securing segment delimits or prevents movement of the locking part in the longitudinal direction, away from the locking segment of the holding part.

In a preferred embodiment, the dimension of the connection part in the transverse direction can be changed. For this purpose, the connection part has two connection elements that can be displaced into one another or onto one another. The connection elements can be disposed so as to telescope, for example. In particular, the two connection elements can form the wall segment and therefore can be structured as two wall components that can be displaced relative to one another.

In a preferred embodiment, a clamping means can be present on at least one attachment part and/or at least one locking part, in order to eliminate movement play between the attachment part and the holding segment or between the locking part and the locking segment, and to ensure stable housing mounting when the housing is affixed to the holding apparatus. At least one clamping screw, for example, can serve as a clamping means, which screw can be clamped against the assigned holding segment or locking segment by means of a threaded hole in the locking part or in the attachment part.

The housing is installed as follows:

The two holding parts are attached to an affixation surface using affixation means, for example screw connections and/or dowel connections. In this regard, the two holding segments of the holding parts have a distance, in the transverse direction, that is adapted to the dimension of the housing. Beforehand, afterward or at the same time, the two attachment parts and the at least one locking part are attached to the housing.

The attachment parts are each brought into engagement with their assigned holding segment. The housing can then be displaced in the longitudinal direction and its mobility is delimited or hindered in the transverse direction as well as at a right angle to the transverse direction and longitudinal direction, by means of the engagement of the attachment parts with the holding segments. The housing is displaced in the longitudinal direction until the at least one locking part enters into engagement with the locking segment, so that further movement of the housing, at least toward one side in the longitudinal direction—for example vertically downward —is prevented.

Preferably, in a preferred exemplary embodiment, the connection part can be connected to the two holding parts. Further preferably, a securing part or a securing segment on the connection part can delimit or prevent a relative movement of the locking part in the longitudinal direction, away from the locking segment. The housing is then secured against a movement in all spatial directions.

Finally, a clamping means can optionally be used to reduce or eliminate any remaining movement play of the attachment parts and/or of the at least one locking part relative to the holding parts.

Other objects and advantages of the invention will become apparent upon reading the following detailed description and upon reference to the drawings, in which:

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENT

Referring now more particularly to the drawings, there is shown an illustrative holding apparatus 10 for a housing 11 in accordance with the invention. The holding apparatus 10 carries the housing 11 and serves to hold the housing 11 on or connect to an affixation surface, not shown. The housing 11 is therefore held on the affixation surface indirectly, by way of the holding apparatus 10. In the exemplary embodiment, the holding apparatus 10 particularly serves for placement of the housing in an outdoors area, and, at the same time, provides protection for the housing against environmental influences, particularly against solar radiation and/or precipitation.

The holding apparatus 10 has two holding parts 12, which are disposed symmetrically relative to a plane that runs between the two holding parts. Each holding part 12 has an affixation segment 13, by means of which the holding part 12 is disposed on the affixation surface and can be affixed or attached to the affixation surface, particularly using an affixation means. At least one and, in particular, multiple screws 14 can serve as affixation means; these can be passed through affixation holes 15 in the affixation segment 13 and can be screwed to the affixation surface.

The affixation segment 13 of each holding part 12 has at least one contact surface 16 with which the holding part 12 lies against the assigned affixation surface. In the preferred exemplary embodiment described here, the contact surface 16 has at least one first surface segment 16a and one second surface segment 16b. The two surface segments 16a, 16b are spaced apart from one another in a transverse direction Q. The transverse direction Q is preferably oriented horizontally in the holding apparatus 10 affixed to the affixation surface. One or more affixation holes 15 are present in each of the two surface segments 16a, 16b. The two surface segments 16a, 16b are disposed in a common plane in the exemplary embodiment.

The two surface segments 16a, 16b of a holding part 12 are connected to one another at one or more locations by way of a holding region 20. In the exemplary embodiment, the holding region 20 has no components that project through the plane in which the contact surface 16 and the two surface segments 16a, 16b are situated. The holding region 20 is spaced apart from the plane in which the contact surface 16 extends. According to the example, the affixation segment 13 has a planar first limb 21 as well as a planar second limb 22. The first surface segment 16a is present on the first limb 21, and the second surface segment 16b is present on the second limb 22. The two limbs 21, 22 are connected by way of a connecting piece 23 of the holding region 20, which piece extends in the transverse direction Q between the two limbs 21, 22.

In the holding region 20, a holding limb 24 that extends in the longitudinal direction L follows on from the connecting piece 23. The holding limb 24 forms a holding segment 25 of the holding part 12. The holding limb 24 is connected to the second limb 22 by way of a double bend or crank. The holding limb 24 thereby extends in a plane that is oriented parallel to the plane of the contact surface and offset relative to the plane of the contact surface. In the longitudinal direction L, a first connection edge 26 extends between the second limb 22 as well as the holding limb 24 and the connecting piece 23. The connecting piece 23 is also connected with the second limb 22 by way of this connection edge 26.

The longitudinal direction L is oriented at a right angle to the transverse direction Q. The longitudinal direction L and the transverse direction Q span a plane in which the contact surface 16 is situated. In the installed state of the holding apparatus 10, the longitudinal direction L is preferably oriented vertically.

In the transverse direction Q, a longitudinal limb 27 that is disposed at a distance from the holding limb 24 in the transverse direction Q extends in the longitudinal direction L, proceeding from the connecting piece 23. The holding limb 24 and the longitudinal limb 27 extend in the same plane. The longitudinal limb 27 is connected to the first limb 21 by way of a double bend or crank, thereby forming a second connection edge 28 that extends in the longitudinal direction L and connects the first limb 21 to the longitudinal limb 27 and the connecting piece 23. The two connection edges 26, 28 extended parallel to one another in the longitudinal direction L, and project transversely away from the plane in which the contact surface 16 is situated.

In the holding region 20, a longitudinal slot 29 extends in the longitudinal direction L. The longitudinal slot 29 is delimited, in the transverse direction Q, by the holding limb 24 on the one hand and by the longitudinal limb 27 on the other hand. In the longitudinal direction L, the longitudinal slot 29 is delimited by the connecting piece 23 on one side and by an end segment 30 of the holding region 20 on the other side.

Bordering on the end segment 30, the longitudinal slot 29 has an insertion recess 34 that widens the longitudinal slot 29 in the transverse direction Q. The insertion recess 34 is formed, according to the example, in that the holding limb 24 does not extend all the way to the end segment 30 in the longitudinal direction L, but rather ends at a distance from it. The first connection edge 26 also extends along the insertion recess 34 all the way to the end segment 30. As a result, sufficient stability of the connection between the second limb 22 and the holding region 30 is ensured.

Figure 1:
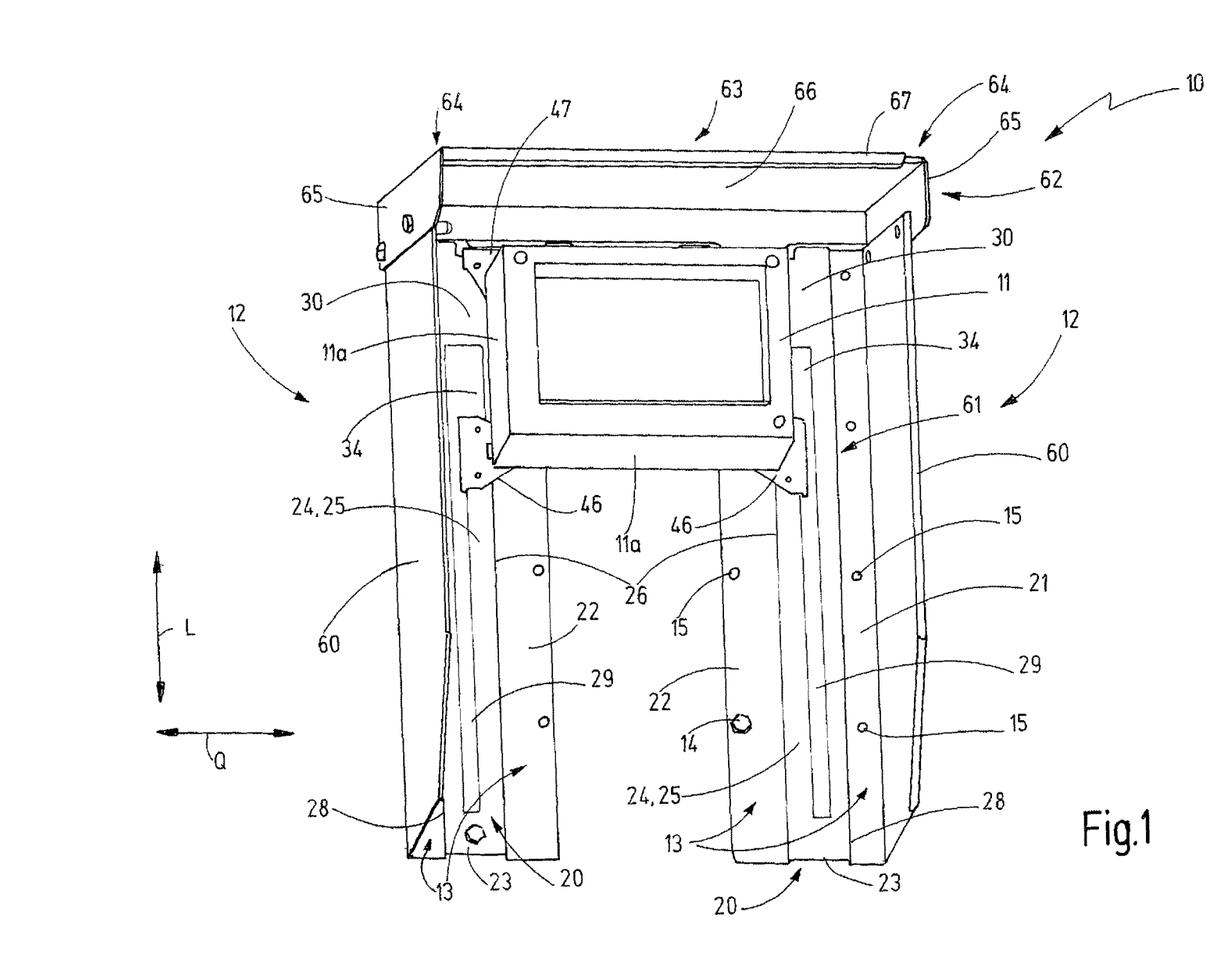
FIG. 1 is a front view of an illustrative holding apparatus for a housing in accordance with the invention.
Figure 2:
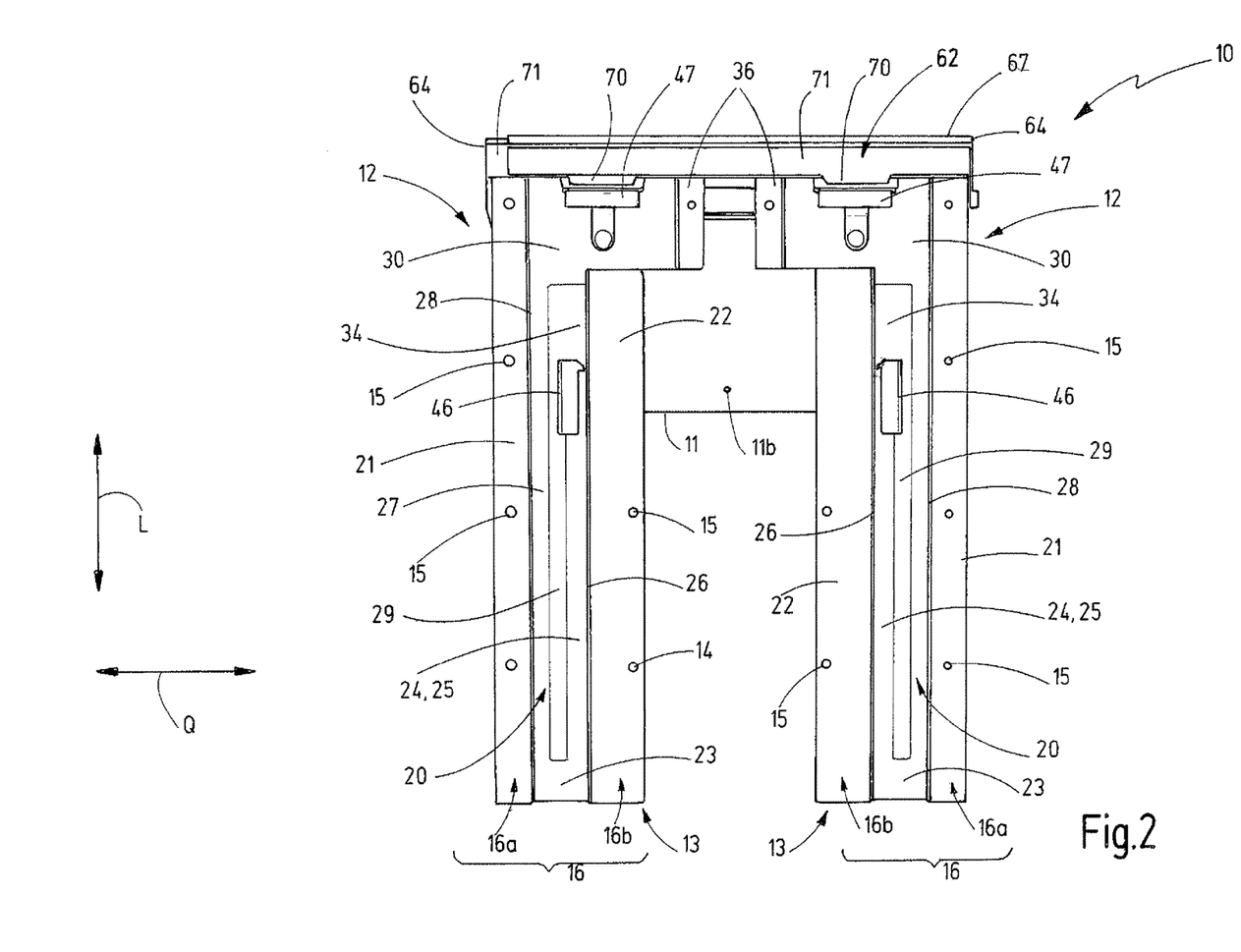
FIG. 2 is a rear-end view of the holding apparatus shown in FIG. 1.
Figure 3:
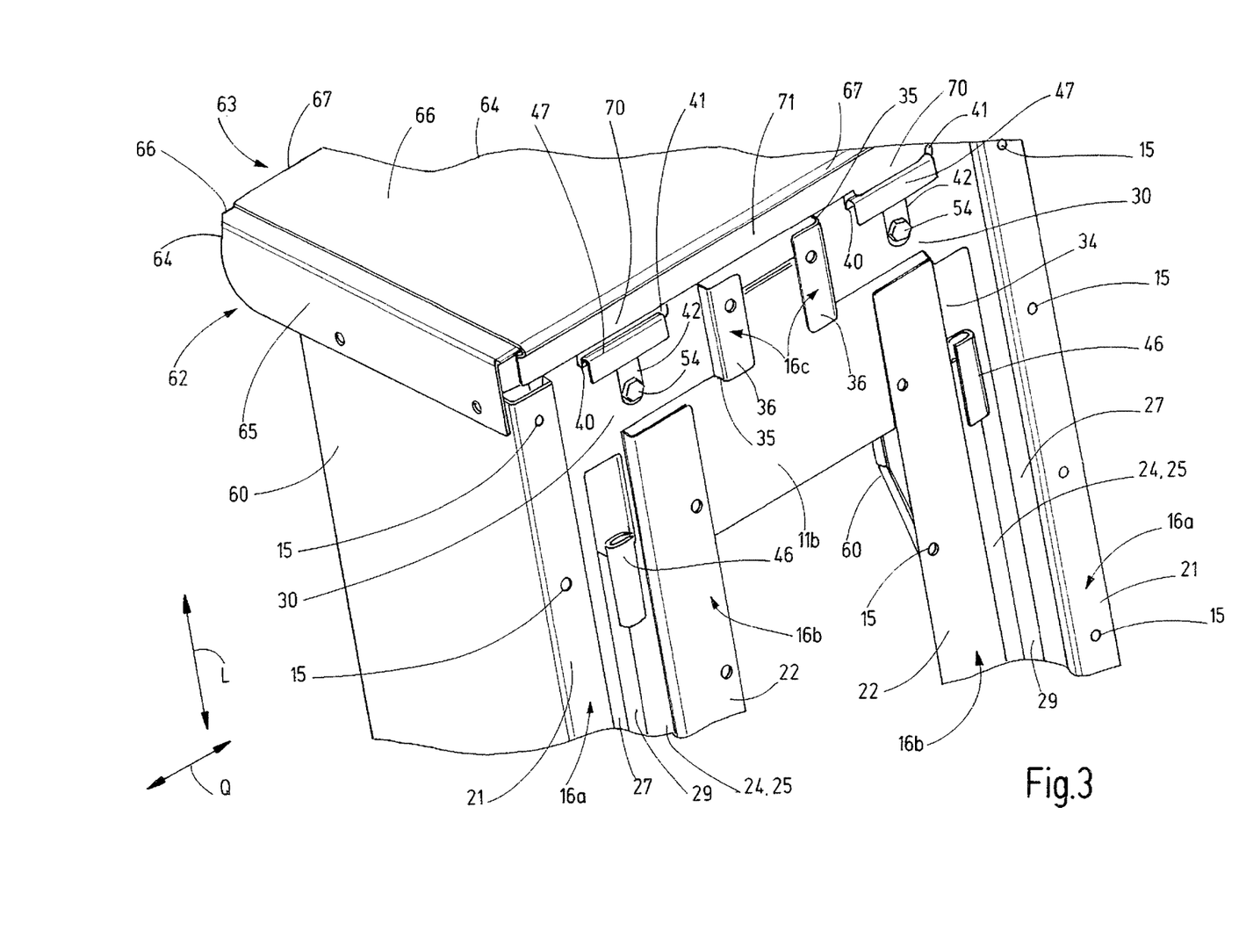
FIG. 3 is an enlarged partial rear perspective of the illustrated holding apparatus.
Figure 4:
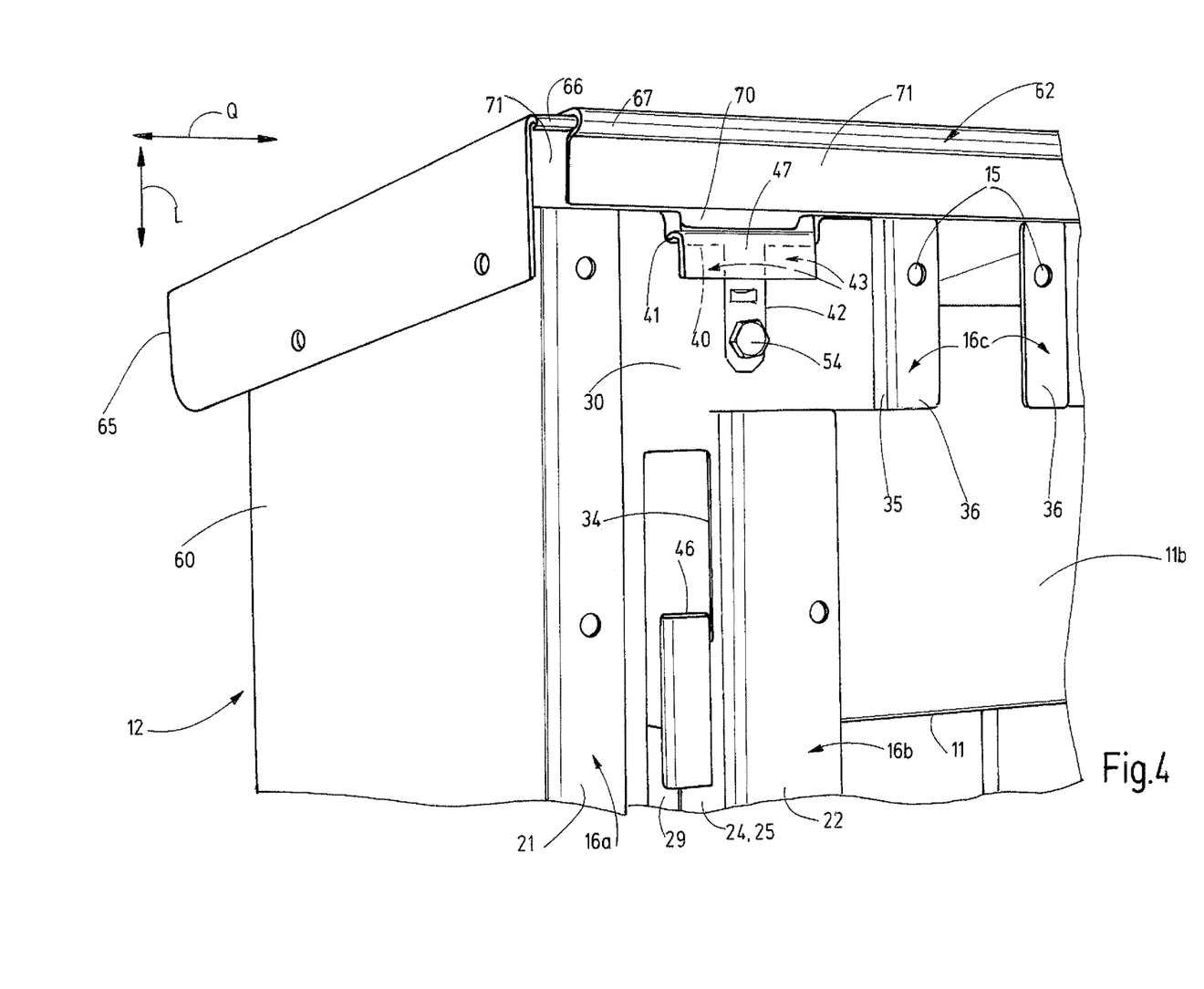
FIG. 4 is a further enlarged rear perspective of the illustrated holding apparatus.

The end segment 30 is particularly illustrated in FIGS. 3 and 4. The end segment 30 extends away from the first limb 21 in the transverse direction Q, proceeding from the second connection edge 28 (FIG. 2). According to the invention, the end segment 30 makes a transition, by way of a third connection edge 35, into a third limb 36 on the side that lies opposite the second connection edge 28 in the transverse direction Q. The third connection edge 35 is formed by a crank or double bend that is present between the end segment 30 and the third limb 36. The third limb 36 can have a third surface segment 16c of the contact surface 16 and at least one affixation hole 15, as in the preferred exemplary embodiment. The third surface segment 16c also extends in the same plane as the two other surface segments 16a, 16b. In the exemplary embodiment described here, the third limb 36 has a greater distance from the first limb 21 than the second limb 22 does, in the transverse direction Q. The second limb 22 is shorter than the first limb 21 in the longitudinal direction L. According to the example, the length of the first limb 21 approximately corresponds to the sum of the length of the second limb 22 and of the third limb 36.

The end segment 30 has a locking edge 40 on its side averted from the holding segment 25. The locking edge 40 extends in the transverse direction Q. In the exemplary embodiment, it is set back relative to a rectangular outer contour of the end segment 30. This is achieved in that a locking recess 41 is present in the end segment 30, which recess is delimited by the locking edge 40 on one side. In the exemplary embodiment, the locking recess 41 is open on the side that lies opposite the locking edge 40. The locking edge 40 is interrupted by a recess 42, according to the example. The recess 42 extends away from the locking edge 40 at a right angle in the longitudinal direction L, into the end segment 30. A locking segment 43 of the holding part 12 or of the end segment 30 follows on from the locking edge 40 in the longitudinal direction L, directly adjacently. The function of this locking segment 43 will still be discussed below.

The holding apparatus 10 furthermore has an attachment part 46 for each holding part 12, as well as at least one locking part 47. The attachment part 46 and the locking part 47 have an identical construction in the preferred exemplary embodiment.

Figure 5:
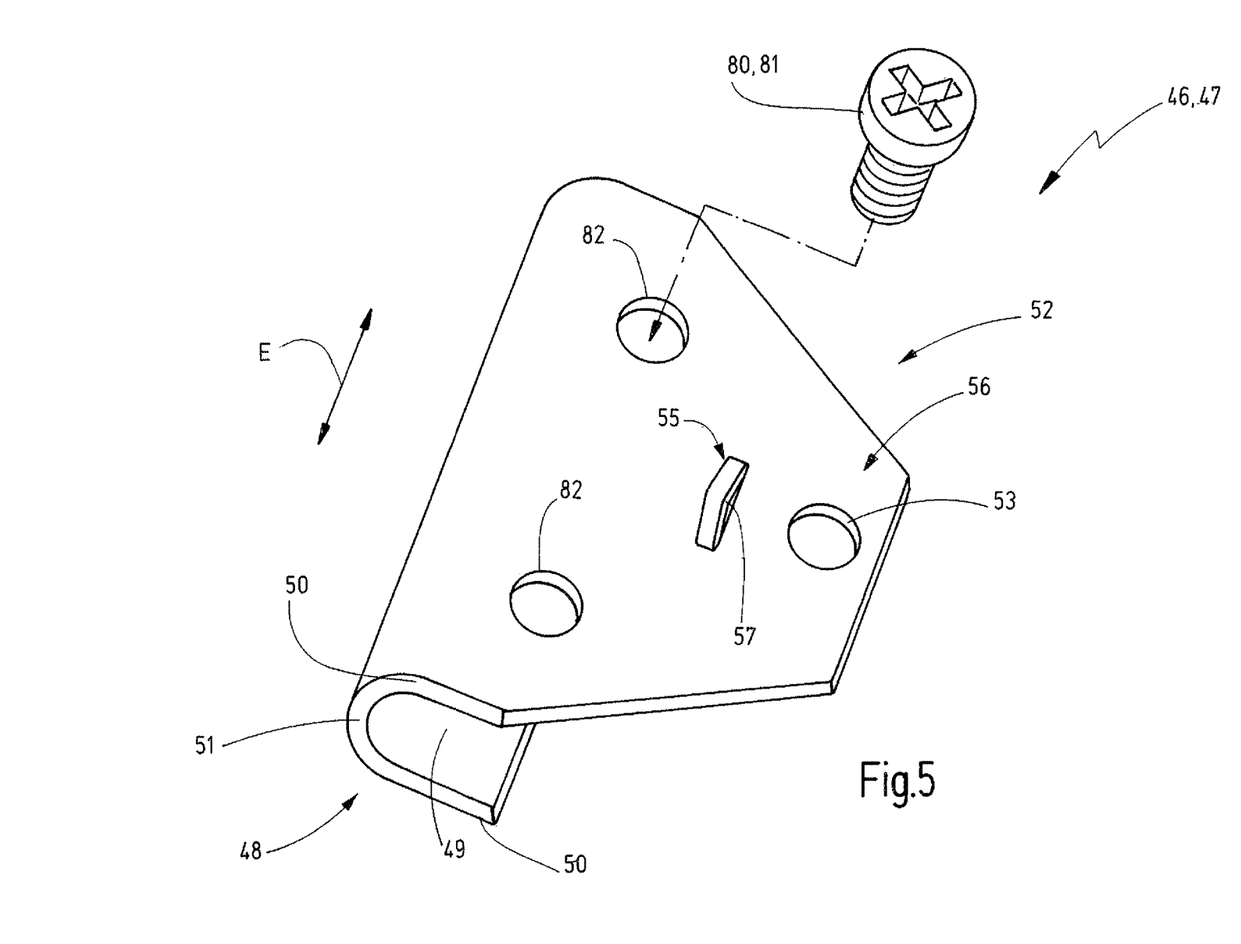
FIG. 5 is an enlarged perspective of a component used as a locking part and/or an attachment part in the illustrated holding apparatus.

The attachment part 46 and/or the locking part 47 has/have a working region 48 through which a gap 49 passes (FIG. 5). The gap 49 is structured to be continuous and uninterrupted in its expanse direction E. The gap 49 is therefore open at both ends in the expanse direction E. In addition, the gap 49 is continuously open on a side transverse to the expanse direction E, so that it has the form of an open groove. The gap 49 is therefore delimited by the working segment 48 of the attachment part 46 or locking part 47 in three spatial directions. For this purpose, the working segment 48 can have two limb parts 50 that delimit the gap 49 on opposite sides. The two limb parts 50 are connected to one another by means of a transverse part 51. For example, the two limb parts 50 and the transverse part 51 can be formed by bending of a planar initial part, so that the working segment 48 has a U-shaped form in a cross section at a right angle to the expanse direction E. The attachment part 46 or the locking part 47 can therefore be structured as a punched part and/or bent part.

An attachment segment 52 follows on from the working segment 48 on one of the two limb parts 50. In the exemplary embodiment, the attachment part 52 has a planar form. The attachment segment 52 can narrow, proceeding away from the limb part 50, and has a trapezoid outer contour, according to the example. With the aid of an attachment hole 53 in the attachment segment 52, the attachment part 46 or the locking part 47 can be connected to the housing 11 via an attachment means, for example an attachment screw 54. In the exemplary embodiment, merely one attachment hole 53 is provided in the attachment segment 52. In order to prevent a rotation of the attachment part 46 or of the locking part 47 about the longitudinal axis of the attachment hole 53, the attachment segment 52 has an anti-rotation device 55. The anti-rotation device 55 is formed by a stop, which has a stop surface 57 and protrudes away from an attachment surface 56 by means of which the attachment segment 52 bears against the housing 11. The stop surface 57 is oriented at a right angle to the attachment surface 56 and, when the connection of the attachment part 46 or of the locking part 47 to the housing 11 has been produced, bears against a lateral wall 11a of the housing 11, at least in part, or has just a small distance from this lateral wall. A rotation of the attachment part 46 or of the locking part 47 about the longitudinal axis of the attachment hole 53 is thus prevented or at least delimited.

The stop having the stop surface 57 is produced, according to the example, by introducing two parallel slots into the attachment segment 52 and curving the connecting piece formed between the slots, in a convex manner. It goes without saying that other stops or protrusions having a stop surface 57 could also be used. Instead of a protrusion having the stop surface 57, the anti-rotation device 55 could also be achieved by different means or measures, for example by providing two attachment holes 53 and an attachment screw 54 for each of said holes.

Since just one attachment screw 54 for attaching the attachment part 46 or the locking part 47 to the rear wall of the housing 11 is used in accordance with the example, it is possible to fix the attachment part 46 or the locking part 47 in different rotational positions. The longitudinal axis of the screw connection between the attachment part 46 or locking part 47 is provided in this instance in the corner region of the rear wall, so that the distance to both lateral walls 11a of the housing 11 bordering on this corner region is of identical magnitude. The stop surface 57 can thus cooperate with either one of the lateral walls 11a in order to delimit a rotation. It is possible, in this way, to orientate the expanse direction E of the gap 49 either in the longitudinal direction L or in the transverse direction Q. If the screw connection between the attachment part 46 or the locking part 47 and the housing 11 is fully tightened, rotation is prevented.

If this screw connection is released at least partially, the attachment part 46 or locking part 47 can be pivoted about the longitudinal axis of the attachment hole 53.

In order to hold the housing 11, the at least one locking part 47 cooperates with the assigned locking segment 43, and each attachment part 46 cooperates with the assigned holding segment, which will be explained further below.

In the exemplary embodiment described here, the two holding parts 12 additionally each have a side wall segment 60, which extends, at a slant or at a right angle, away from the plane in which the contact surface 16 is situated. An accommodation region 61 for the housing 11 is formed between the two side wall segments 60 of the holding parts 12. The side wall segments 16 provide protection for the housing 11 against weathering or environmental influences, such as solar radiation or precipitation.

The holding apparatus 10, in the exemplary embodiment described here, additionally has a connection part 62. The connection part 62 connects the two holding parts 12 to one another and extends in the transverse direction Q from one holding part 12 to the other holding part 12. According to the example, the connection part 62 has a wall segment 63 delimiting the accommodation region 61 on one side in the longitudinal direction L. The wall segment 63 is formed for example as a roof for protection of the housing 11.

The connection part 62, in the exemplary embodiment, has two connection elements 64 that can be displaced onto one another or into one another. Each of the two connection elements 64 has a lateral end 65. The lateral end 65 is formed by a planar segment. The lateral end 65 serves for the connection of the relevant connection element 64 to the assigned holding part 12 and, according to the example, to the side wall segment 60 of the holding part 12. By way of example, the connection can be produced by a screw connection. The planar lateral end 65 is oriented in this instance parallel to the side wall segment 60.

An element segment 66 of the connection element 64 follows on from each lateral end 65 at a right angle thereto.

The element segment 66 of one connection element 64 has a curved edge 67 at each of its two edge regions extending in the transverse direction Q, said curved edge forming a guide gap for the other element segment 66. Due to the two guide gaps formed by the two curved edges 67 of one element segment 66, the other connection element 64 can be arranged with its element segment 66 displaceably guided in the guide gaps. The dimension of the connection part 62 and consequently the distance of the two lateral ends 65 can thus vary. The wall segment 63 is closed continuously flat by the element segments 66. The connection part 62 can, in this way, be varied from a minimum dimension to a maximum dimension. The dimension between the two lateral ends 65 can increase by up to almost 100%. A doubling of the dimension proceeding from the minimum dimension is not quite possible, since a certain overlap of the two element segments 66 in the transverse direction is necessary. Otherwise, the two connection elements 64 would no longer be guided onto one another.

In the plane in which the locking segments 43 or the locking edges 40 of the two holding parts 12 are situated, the connection part 62 has at least one securing segment 70. Since, according to the example, each holding part 12 has a locking segment 43, two securing segments 70 are provided accordingly. The two securing segments 70 are provided one on each securing limb 71, according to the example. The securing limbs 71 extend in the transverse direction Q in a manner directly bordering on the end segments 30 of the two holding parts 20 or on the locking recesses 41.

In the exemplary embodiment described here, each of the two connection elements 64 has a securing segment 70 on a securing limb 71. The two securing limbs 71 bear against one another by means of the connection elements 64 displaceable onto one another. Each securing limb 71 has a securing segment 70 with a protrusion protruding into the assigned securing recess 41. The distance of the securing segment 70 from the lateral end 65 is adapted to the distance of the locking segment 43 from the side wall segment 60 and remains constant, irrespective of the distance of the holding parts 12 in the transverse direction Q. Since the dimension of the connection part 62 and the distance of the two holding parts 12 can change, it can be ensured, as a result of this embodiment, that each securing segments 17 remains assigned to the assigned locking segment 43.

The holding part 12 and/or the connection part 62 and/or the attachment parts 46 and/or the at least one looking part 47 can be produced from a planar starting material, for example by cutting and/or punching and bending a metal sheet.

The holding apparatus 10 is used, as described hereinafter, in order to arrange a housing 11 directly on an affixation surface.

The two holding parts 12 are first placed via their respective contact surfaces 16 on the affixation surface and are attached there, for example by means of a screw connection or the like. The type of connection it is dependent in particular on how the affixation surface is constructive. If, for example, the affixation surface is an outer wall of a building, a dowel connection can also be used to affix the holding parts 12 to the affixation surface.

The distance of the two holding parts 12 in the transverse direction Q is determined here in a manner dependent on the dimension of the housing 11 in the transverse direction Q.

The two attachment parts 46 as well as the two locking parts 47 are attached to a rear wall 11b of the housing 11. In this instance, the expanse direction E of the gap 49 of the two attachment parts 46 is oriented in the longitudinal direction L, whereas the expanse direction E of the gap 49 of the two locking parts 47 is oriented in the transverse direction Q.

The two previously described steps can be performed chronologically independently of one another.

The housing 11 prepared in this way is now arranged on the holding parts 12. For this purpose, the working segments 48 of the two attachment part 46 are firstly each inserted into an assigned insertion recess 34. The housing 11 is then displaced with the two attachment parts 46 in the longitudinal direction L, such that each holding segment 25 or holding limb 24 enters into engagement with the assigned attachment part 46. In so doing, the holding limb 24 enters the assigned gap 49 of the attachment part 46, and the working segment 48 of the attachment part 46 encloses the holding segment 25.

When the holding limbs 24 are in engagement with the respective assigned attachment parts 46, the housing 11 can be moved along the holding limb 24 in the longitudinal direction L. A movement of the housing 11 in the other directions is prevented or delimited. Merely the remaining movement play between the holding limb 24 and the assigned attachment part 46 allows a slight movement of the housing 11 in the transverse direction Q or at a right angle to the longitudinal direction L and to the transverse direction Q with respect to the affixation surface.

The housing 11 is now moved in the longitudinal direction L, vertically downward according to the example, until the two locking parts 47 enter into engagement with the respective assigned locking segments 43. The locking parts 47 are arranged vertically above the attachment parts 46 on the housing 11 in the exemplary embodiment. Said locking parts hook, so to speak, on the respective assigned locking segments 43 and prevent a further movement of the housing 11 in the longitudinal direction L, at least towards one side, vertically downward according to the example.

Lastly, the connection part 62 is installed. One of the two lateral ends 65 is firstly attached to a side wall segment 60 of one holding part 12, via a screw connection according to the example. The other connection element 64 is then brought into a position such that the dimension of the connection part 63 in the transverse direction Q approximately corresponds to the distance between the two side wall segments 60 in the transverse direction Q. The other lateral end 65 is then connected to the other side wall segment 60, via a screw connection according to the example.

By affixing the connection part 62 to the two holding parts 12 and, according to the example, the side wall segments 60, the securing segment 70 of each connection element 64 is brought into a position in which it is arranged at a predefined distance from the locking segment 43 or the locking edge 40 in the longitudinal direction L. The locking parts 47 are thus prevented from becoming disengaged from their respective assigned locking segments 43. A certain movement play, indeed, can remain between the locking part 47 and the assigned securing segment 70, however the locking part 47 cannot be fully disengaged from the locking segment 43. It is therefore no longer possible to remove the housing 11 from the holding apparatus 10.

The attachment part 46 and/or the locking part 47 can have a clamping means 80. A movement play between the attachment part 46 and the assigned holding segment 25 or between the locking part 47 and the assigned locking segment 43 can be eliminated or at least reduced via the clamping means 80. In the exemplary embodiment, a clamping screw 81 serves as clamping means 80. The clamping screw 81 can be screwed into a threaded opening 82, which is arranged, at least in part, in the working segment 48. In the exemplary embodiment illustrated here, the attachment part 46 or the locking part 47 has two threaded openings 82, each having an assigned clamping screw 81. Alternatively, one threaded opening 81 and one clamping screw 81 can also be sufficient.

Once the housing 11 has been arranged on the holding parts 12, the clamping screws 81 can be tightened, thus reducing or eliminating any movement play. The housing 11 can thus be secured against rattling.

The housing 11 or the holding apparatus 10 can be disassembled in the reverse order, accordingly.

The invention relates to a holding apparatus 10 for a housing 11, as well as to a method for affixing the holding apparatus 10 and the housing 11 to an affixation surface, in particular a building surface, for example an external building surface. The holding apparatus 10 delimits an accommodation region 61 for the housing 11, preferably by wall segments 60, 63, and can thus provide a protection against solar radiation, precipitation and other weathering or environmental influences. The holding apparatus 10 has two holding parts 12 that each have a holding segment 25 that extends in a longitudinal direction L. At least one of the two holding parts 12 additionally has a locking segment 43. Two attachment parts 46 and, for each locking segment 43, one locking part 47 are affixed to a rear wall 1 lb of the housing 11. To mount the housing 11 on the holding apparatus 10, the two attachment parts 46 are firstly each brought into engagement with their assigned holding segment 25. By displacing the housing 11 in the longitudinal direction L, the at least one locking part 47 enters into engagement with the locking segment 43. A continued movement of the housing 11 in the longitudinal direction L is thus at least delimited. Each locking part 47 can be assigned a securing segment 70, which additionally delimits the movement of the locking part 47 away from the assigned locking segment 43. The securing segment 70 is preferably provided on a connection part 62 that connects the two holding parts 12.

LIST OF REFERENCE SIGNS 10 holding apparatus
11 housing
11a lateral wall
11b rear wall
12 holding part
13 affixation segment
14 screw
15 affixation hole
16 contact surface
16a first surface segment
16b second surface segment
16c third surface segment
20 holding region
21 first limb
22 second limb
23 connecting piece
24 holding limb
25 holding segment
26 first connection edge
27 longitudinal limb
28 second connection edge
29 longitudinal slot
30 end segment
34 insertion recess
35 third connection edge
35 third limb
40 locking edge
41 locking recess
42 recess
43 locking segment
46 attachment part
47 locking part
48 working segment
49 gap
50 arm part
51 transverse part
52 attachment segment
53 attachment hole
54 attachment screw
55 anti-rotation device
56 attachment surface
57 stop surface
60 side wall segment
61 accommodation region
62 connection part
63 wall segment
64 connection element
65 lateral end
66 element segment
67 curved edge*
70 securing segment
71 securing limb
80 clamping means
81 clamping screw
82 threaded opening
L longitudinal direction
Q transverse direction

The invention claimed is:

1. A holding apparatus (10) for a housing (11) comprising:
two holding parts (12) each having an affixation segment (13) for affixing to an affixation surface by an affixation device (14);
said two holding parts (12) each having a respective elongated holding segment (25) that extends in a longitudinal direction (L);
two attachment parts (46) each attachable to the housing (11) and engageable with the holding segment (25) of a respective one of the two holding parts (12) for providing a connection therebetween that permits relative movement in the longitudinal direction (L) between the two attachment parts (46) and the two holding parts (12);
a locking part (47) attachable to the housing (11), one of said two holding parts (12) having a locking segment (43), said locking part (47) being engageable with said locking segment (43) such that the relative movement in the longitudinal direction (L) between the holding part (12) having the locking segment (43) and the attachment part (46) engageable with the holding part (12) having the locking segment (43) is limited or prevented, and
a connection part (62) releasably connectable to said two holding parts (12) at a distance in said longitudinal direction (L) from the holding segments (25) of the two holding parts (12).

2. The holding apparatus of claim 1 including two of said locking parts (47) each engageable with a respective separate locking segment (43) arranged on a respective one of the two holding parts (12).

3. The holding apparatus of claim 1 in which said locking part (47) and attachment parts (46) are identical.

4. The holding apparatus of claim 1 in which at least one of the two holding parts (12) has a locking recess (41) on which the locking segment (43) borders.

5. The holding apparatus of claim 4 in which the locking recess (41) is open in the longitudinal direction (L) on a side opposite from the holding segment (25).

6. The holding apparatus of claim 1 in which at least one of the two holding parts (12) has a side wall segment (60) that projects away from the affixation segment (13) at an angle and delimits an accommodating region (61) for the housing (11).

7. The holding apparatus of claim 1 in which the connection part (62) has a wall segment (63) that projects away from the affixation segments (13) at an angle when the connection part (62) connected to the holding parts (12).

8. The holding apparatus of claim 1 in which the connection part (62) has at least one securing segment (70) that upon connection of the connection part (62) to the two holding parts (12) limits or prevents movement of an assigned locking part (47) in the longitudinal direction (L).

9. The holding apparatus of claim 1 in which the connection part (62) has two connection elements (64) that can be displaced relative to one another for changing the dimension of the connection part (62).

10. The holding apparatus of claim 1 in which the two holding parts (12) are separate parts that can be affixed to the affixation surface at selective distances with respect to each other.

11. The holding apparatus of claim 1 in which when the locking part (47) is in engagement with the locking segment (43) the position of the attachment parts (46) relative to the respective holding segment (25) is dependent on the dimension of the housing (11) in the longitudinal direction (L).

12. The holding apparatus of claim 1 in which the two holding parts (12) are connected to the housing (11) only by means of the attachment parts (46) and the locking part (47).

13. A holding apparatus (10) for a housing (11) comprising:
    two holding parts (12) each having an affixation segment (13) for affixing to an affixation surface by an affixation device (14);
    said two holding parts (12) each having a respective elongated holding segment (25) that extends in a longitudinal direction (L);
    two attachment parts (46) each attachable to the housing (11) and engageable with the holding segment (25) of a respective one of the two holding parts (12) for providing a connection therebetween that permits relative movement in the longitudinal direction (L) between the two attachment parts (46) and the two holding parts (12);
    a locking part (47) attachable to the housing (11), one of said two holding parts (12) having a locking segment (43), said locking part (47) being engageable with said locking segment (43) such that the relative movement in the longitudinal direction (L) between the holding part (12) having the locking segment (43) and the attachment part (46) engageable with the holding part (12) having the locking segment (43) is limited or prevented, and
    said locking part (47) and two attachment parts (46) each has two limb parts (50) disposed a distance form one another which define a gap (49) disposed between the two limb parts (50).

14. The holding apparatus of claim 13 in which each attachment part (46) encloses the holding segment (25) with which it is engageable.

15. The holding apparatus of claim 13 in which said locking part (47) encloses said locking segment (43).

16. The holding apparatus of claim 13 in which the gap (49) of the locking part (47) is closed on a side in the longitudinal direction (L) at least in part by a transverse part (51) that connects the two limb parts (50) to one another.

17. The holding apparatus of claim 13 in which the gap (49) of the attachment part (46) is closed on one side in the longitudinal direction (L) at least in part by a transverse part (51) that connects the two limb parts (50) to one another and that is oriented at a right angle to the longitudinal direction (L).

* * * * *